(12) United States Patent
Briquet et al.

(10) Patent No.: US 6,465,652 B1
(45) Date of Patent: Oct. 15, 2002

(54) QUINACRIDONE PIGMENT

(75) Inventors: Anne Briquet, Martigny; Bansi Lal Kaul, Biel-Benken, both of (CH)

(73) Assignee: Clariant Finance (BVI) Limited, Tortola (VG)

( * ) Notice: Subject to any disclaimer, the term of this patent is extended or adjusted under 35 U.S.C. 154(b) by 10 days.

(21) Appl. No.: 09/633,223

(22) Filed: Aug. 7, 2000

Related U.S. Application Data

(63) Continuation of application No. 09/035,558, filed on Mar. 5, 1998, now abandoned.

(30) Foreign Application Priority Data

Mar. 6, 1997 (GB) ................................ 9704665

(51) Int. Cl.⁷ ..................... C07D 471/00; C07D 471/22
(52) U.S. Cl. ......................................... 546/56; 546/49
(58) Field of Search ...................... 546/56, 49

(56) References Cited

U.S. PATENT DOCUMENTS

| | | | | |
|---|---|---|---|---|
| 3,257,405 A | | 6/1966 | Gerson et al. ............... 546/49 |
| 3,261,836 A | * | 7/1966 | Chen | |
| 4,064,129 A | * | 12/1977 | Gerson | |
| 4,455,173 A | * | 6/1984 | Jaffe | |
| 4,810,304 A | | 3/1989 | Jaffe et al. ................. 106/494 |
| 5,095,056 A | | 3/1992 | Babler ........................ 524/90 |
| 5,424,429 A | * | 6/1995 | Hendi | |
| 5,496,405 A | | 3/1996 | Campos et al. ............ 106/495 |
| 5,783,723 A | * | 7/1998 | Campbell | |

FOREIGN PATENT DOCUMENTS

| | | |
|---|---|---|
| CA | 999865 | 11/1976 |
| EP | 0466649 | 1/1992 |
| EP | 0 544 160 | 6/1993 |
| FR | 1226260 | 7/1960 |
| FR | 1274726 | 2/1962 |
| FR | 2137546 | * 12/1972 |
| GB | 896803 | * 6/1959 |
| GB | 823069 | * 10/1960 |
| GB | 868360 | 5/1961 |
| GB | 896803 | 5/1962 |
| GB | 0896916 | 5/1962 |
| GB | 923069 | 4/1963 |
| GB | 1020068 | 2/1966 |
| GB | 1390093 | 4/1975 |
| GB | 1557694 | 12/1979 |
| JP | 63199769 | 8/1988 |
| JP | 8314184 | 11/1996 |

OTHER PUBLICATIONS

Abstract for JP 63199769, 1996.
Chemical Abstracts 86:30984, Eshkova, 1976.
Chemical Abstracts 93:9542, Yokoyama 1980.
Chemical Abstracts 126:124751, Chiba, 1996.
Chemical Abstracts 119:228101, Zaloum, 1993.
Chemical Abstracts 109:232171, Jaffe, 1988.
Chemical Abstracts 78:73659, Sandoz, 1972.
Abstract for JP 8314184.

* cited by examiner

*Primary Examiner*—D. Margaret Seaman
(74) *Attorney, Agent, or Firm*—Susan S. Jackson; Scott E. Hanf

(57) ABSTRACT

A new polymorphic form of 2,9-dichloroquinacridone having improved pigmentary properties and a method of forming said 2,9-dichloroquinacridone comprising the step of ring closure of appropriately substituted terephthalic acid in sulphuric acid.

5 Claims, 4 Drawing Sheets

QUINACRIDONE PIGMENT

CROSS-REFERENCE TO RELATED APPLICATIONS

This application is a continuation of U.S. application Ser. No. 09/035,558, filed Mar. 5, 1998 now abandoned.

This invention relates to quinacridone pigments and a process of producing the same.

Quinacridone pigments are well known organic pigments which are particularly useful as colourants for high molecular weight organic materials.

FIELD OF THE INVENTION

Of the quinacridone pigments the di-substituted pigments, more particularly 2,9-dichloroquinacridone, are most notable for their pigmentary properties. 2,9-dichloroquinacridone is known to exist in three different polymorphic forms and it is known that each of the particular polymorphic forms have different pigmentary properties. In fact, the polymorphic form displays the best pigmentary properties.

BACKGROUND OF THE INVENTION

It has now been found that a new polymorphic form of 2,9-dichloroquinacridone can be formed by a synthesis utilizing concentrated sulphuric acid.

The invention provides in one of its aspects a polymorphic form of 2,9-dichloroquinacridone having an x-ray diffraction pattern which comprises a major reflection corresponding to an interplanar spacing (d-value) of 3.20 Angstroms and an associated double glancing angle (Grade 2θ) of 27.9.

The new polymorphic form of 2,9-dichloroquinacridone is characterized by a number of reflections in its x-ray diffraction pattern which are not all found in the other known forms of this pigment. They include those reflections having the following interplanar spacings (d-value) and double glancing angles (Grade 2θ):

| d-Value(Angstroms) | Grade 2θ |
| --- | --- |
| 16.73 | 5.3 |
| 6.33 | 14.0 |
| 5.82 | 15.2 |
| 5.36 | 16.5 |
| 4.62 | 19.2 |
| 4.18 | 21.3 |
| 3.88 | 22.9 |
| 3.81 | 23.3 |
| 3.64 | 24.4 |
| 3.52 | 25.3 |
| 3.35 | 26.6 |
| 3.19 | 27.9 |
| 3.08 | 29.0 |
| 2.91 | 30.7 |
| 2.80 | 31.9 |
| 2.68 | 33.4 |
| 2.45 | 36.7 |
| 2.39 | 37.6 |
| 2.28 | 39.4 |

It will be understood that the figures recited above for the d-value and the double glancing angle are of course subject to fluctuation due to experimental error of ±0.1 (double glancing angle)

DESCRIPTION OF THE PREFERRED EMBODIMENTS

The invention provides in another of its aspects a process of making a 2,9-dichloroquinacridone comprising the step of reacting 2,5-di(4-chloroanilino)terephthalic acid in concentrated sulphuric acid.

The term "concentrated sulphuric acid" includes the acid at a strength of 90 to 95%, especially 92%.

The reaction is carried out at elevated temperatures, between 100 to 130° C., more preferably at 110° C.

The 2,5-di(4-chloroanilino)terephthalic acid starting material can be conveniently formed from dimethyl succinylosuccinate and 4-chloroaniline according to conventional syntheses employing commonly available reagents.

Preferably the 2,9-dichloroquinacridone formed according to the afore-mentioned reaction is filtered and washed salt-free with water before optionally being dried under vacuum at elevated temperature and optionally used as wet cake.

The 2,9-dichloroquinacridone so formed is in a crude form and is generally not possessed of the requisite desirable pigmentary properties. Accordingly, the crude quinacridone has to be processed further to obtain its desirable pigmentary properties. In a process according to the invention, the crude 2,9-dichloroquinacridone once formed is further processed by milling. Milling is preferably carried out using a ball-mill according to a procedure known in the art. The grinding action is carried out using, e.g. glass balls having a diameter of from 0.6 mm to 0.9 mm.

The 2,9-dichloroquinacridone pigment according to the invention can be applied to polymeric materials and displays better purity of nuance than heretofore achievable for the quinacridone pigments.

The term "polymeric materials" includes solvent-containing and solvent-free plastics materials, e.g. polyolefin, PVC, polystyrene and acrylic, polyester, alkyd or polyurethane lacquers.

There now follows a series of examples which serve to illustrate the invention.

EXAMPLE 1

Synthesis of 2,5-di(4-chloroanilino)terephthalic Acid

A four-necked flask equipped with thermometer, stirrer and condenser is flushed with nitrogen and then charged with 228.2 parts of dimethyl succinylosuccinate, 267.8 parts of 4-chloroaniline and 3.3 parts of 65% sulphuric acid in 890 parts of n-butanol. The reaction mixture is stirred and heated to 110 to 115° C. for 3 hours. During this time, 222.5 parts of n-butanol are allowed to distil over and are condensed for later use. After cooling the reaction mixture to 105° C., the n-butanol is returned to the reaction mixture followed by 5.3 parts of triethylamine and the condenser is replaced with a reflux condenser. The mixture is cooled to 90° C., 150.3 parts of powdered sodium m-nitrobenzene sulphonate is added over a 10 minute period and the mixture heated to reflux. A dropping funnel is introduced to the apparatus and 392.0 parts of 30% sodium hydroxide is added dropwise over a one hour period into the reaction mixture. Refluxing is continued for 2 hours. Thereafter the reflux condenser is replaced with a condenser and 1760 parts of water are added dropwise to the reaction mixture to allow for azeotropic distillation of the n-butanol. The content of the flask is cooled to 70° C. and the pH is adjusted to 5 with 304 parts of 35% hydrochloric acid. The resulting slurry is filtered, washed with hot water until the filtrate has a pH of 5 and dried conventionally under vacuum to yield 389 parts of the title compound.

EXAMPLE 2

Synthesis of 2,9-dichloroquinacridone

To 937 parts of 92% sulphuric acid at 110° C. are added over a period of 3 hours 300 parts of 2,5-di(4-chloroanilino) terephthalic acid. The resultant mixture is heated for 12 hours at 130° C. The acid strength is reduced to 75% with the dropwise addition of 203 parts 33% sulphuric acid. The temperature of the resulting suspension is allowed to rise over the next 3 hours to 30° C. The solids in the reaction mixture are collected by filtration and washed with 1000 parts of sulphuric acid (75%), 2000 parts of water, 83.2 parts of ammonia (25%) and 2000 parts of water to obtain 385 parts of wet cake which is optionally oven dried under vacuum to yield 224.9 parts of crude 2,9-dichloroquinacridone.

Milling of the Crude 2,9-dichloroquinacridone

A 0.5 liter jar is charged with 17.1 parts of crude 2,9-dichloroquinacridone wet-cake (58.4%=10 g 100%), 30 parts of sodium chloride, 150 parts of acetone and 500 parts of glass beads (diameter 0.6 to 0.9 mm). The jar is sealed and rotated on a roller mill for 72 hours. The mixture is then sieved to separate the balls, filtered and washed with 2000 parts of water. The resultant pigment is dried under vacuum at 100° C.

The resultant pigmentary form is characterized by its x-ray diffraction pattern which is shown in FIG. 1 and FIG. 2. The x-ray diffraction pattern can be compared with the x-ray diffraction pattern of the pigmentary form obtained by cyclisation in polyphosphoric acid according to a process described in GB 868 360 and subjected to the milling step described above, see FIG. 3 and FIG. 4.

Cyclisation of 2,5-di(4-chloroanilino)terephthalic acid in polyphosphoric acid as described in the following documents GB 868 360, US 3 257 405, JP 63 199 769 and US 5 496 405 represent the state of the art methods of obtaining 2,9-dichloroquinacridone.

APPLICATION EXAMPLE A

Figure 1:
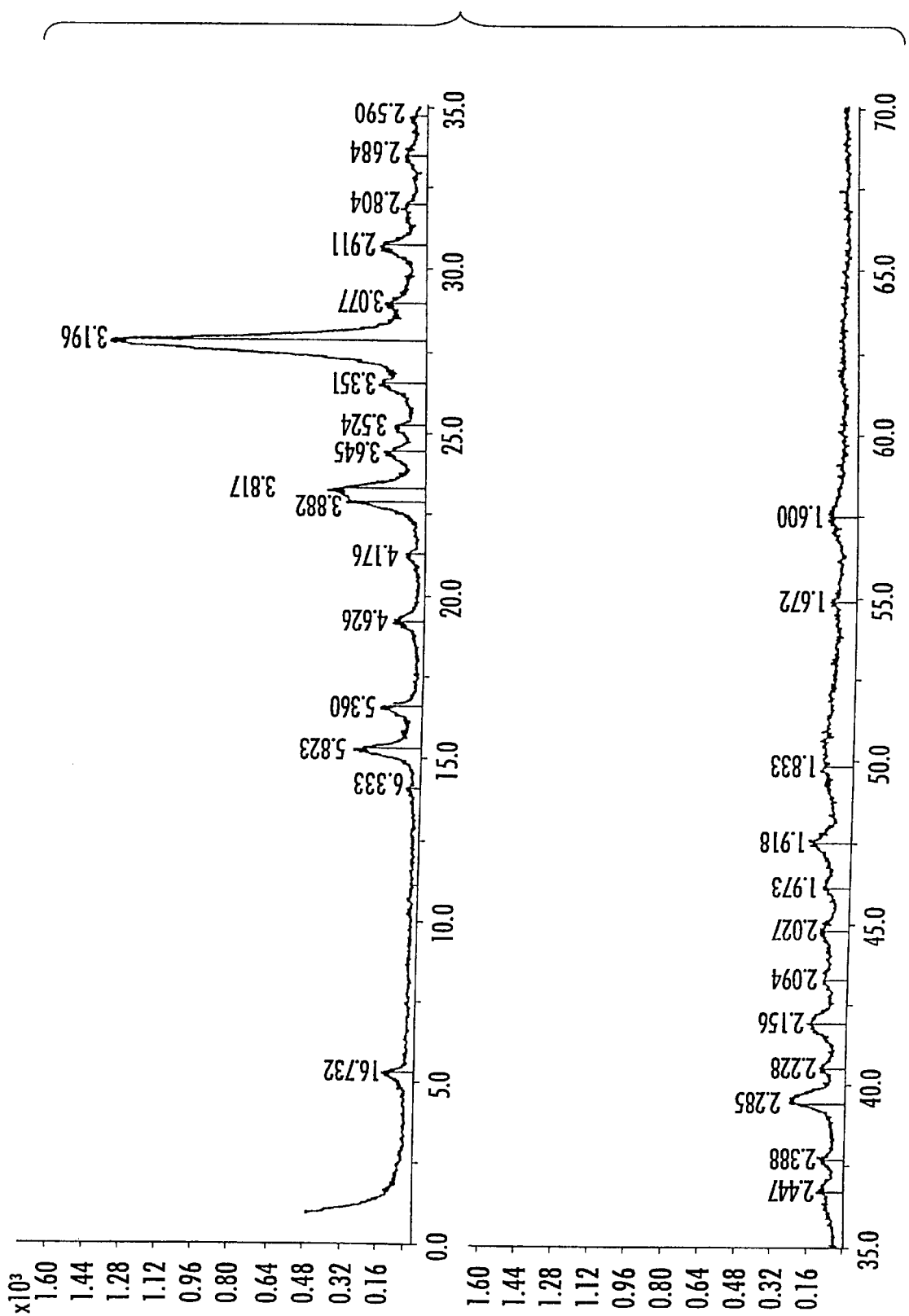
FIG. 1 shows the x-ray diffraction pattern of the pigmentary form of 2,9-dichloroquinacridone formed according to the methodology of Example 2. The numerical values associated with each peak represent the interplanar spacings in Angstroms.
Figure 2:
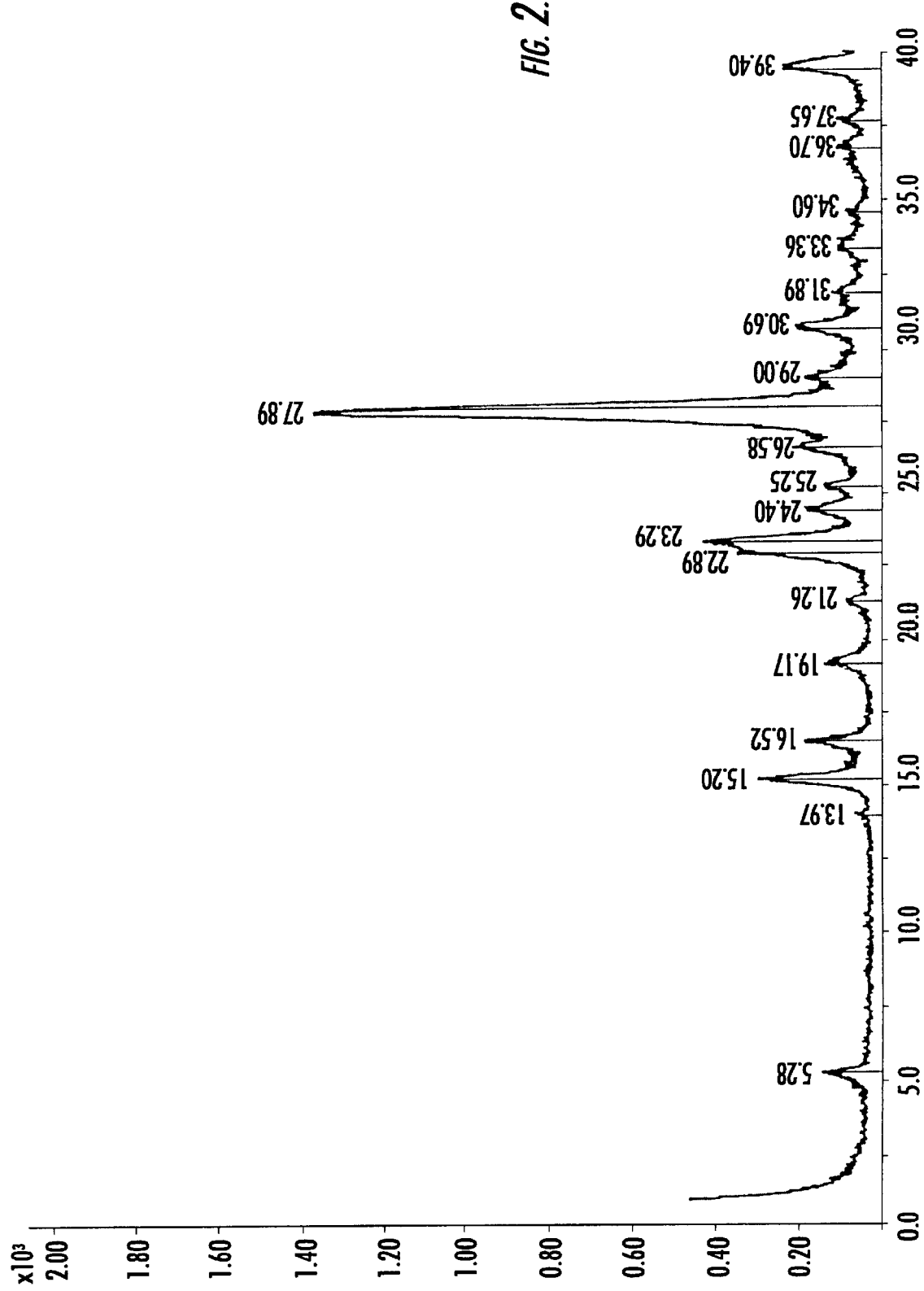
FIG. 2 shows the x-ray diffraction pattern of the pigmentary form of 2,9-dichloroquinacridone formed according to the methodology of Example 2. The numerical values associated with each peak represent the double glancing angles.
Figure 3:
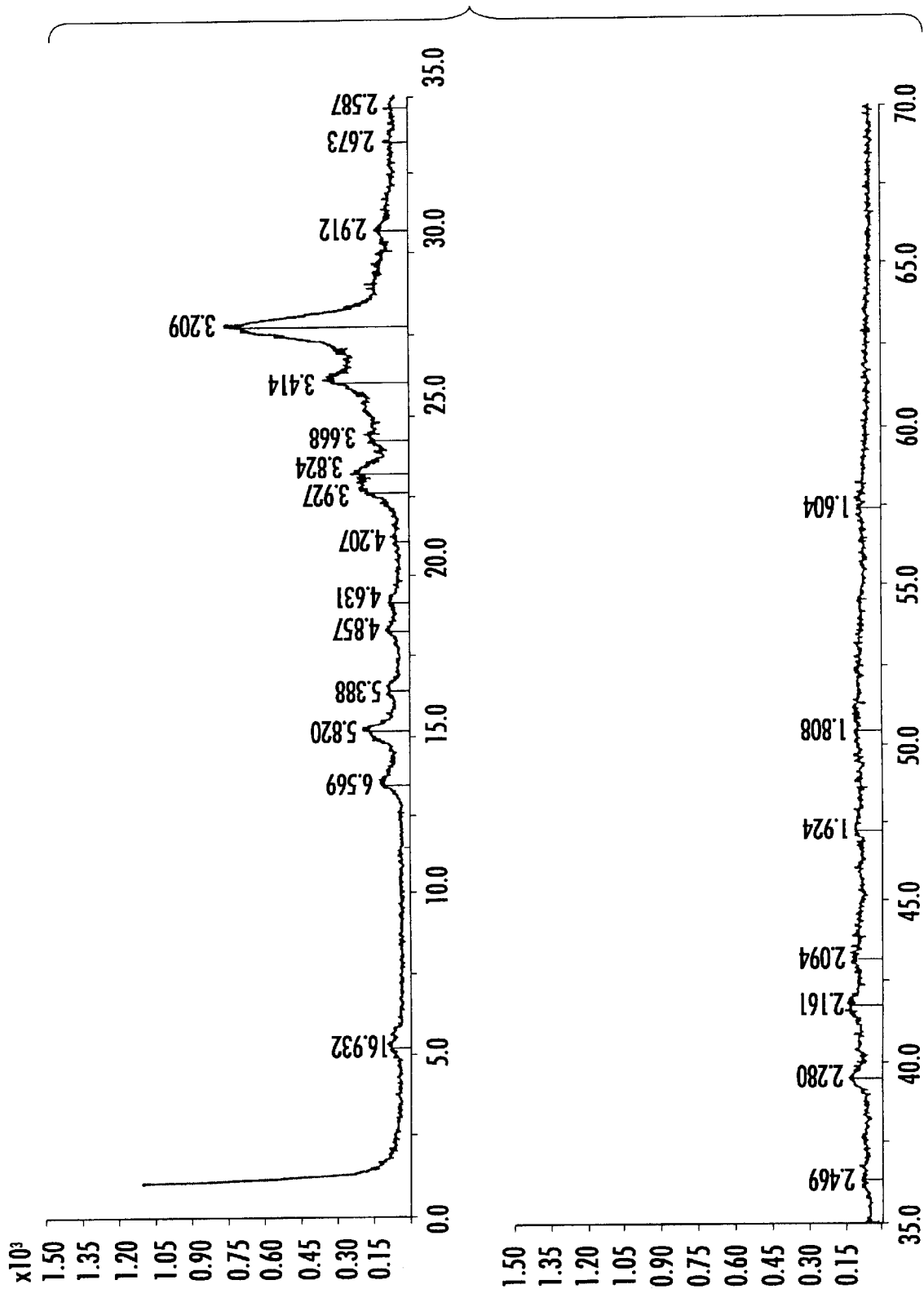
Figure 4:
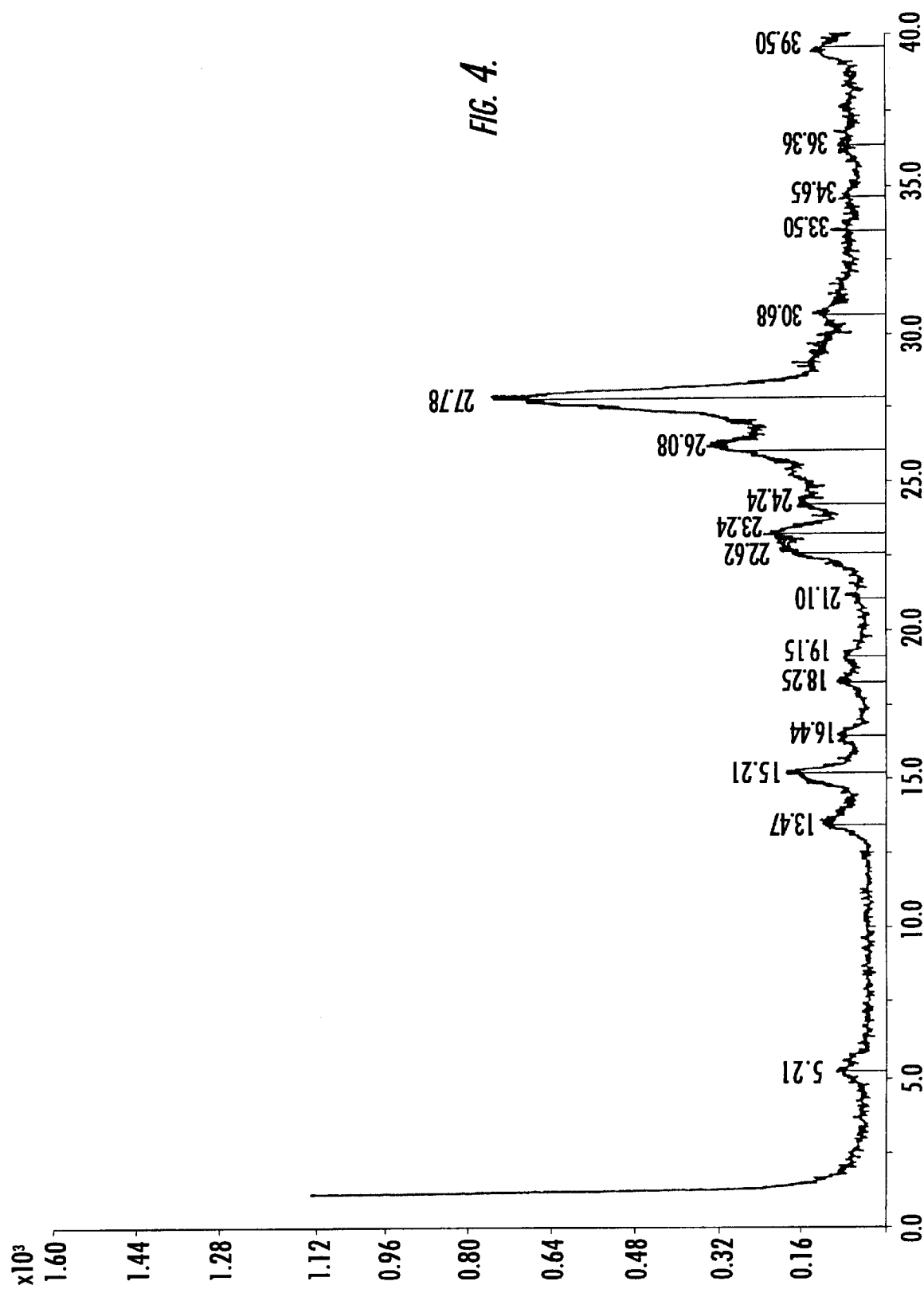

The following experiment is carried out on a pigment form obtained according to the procedure of Example 2 and also on a commercial 2,9-dichloroquinacridone pigment Cinquasia Magenta RT-343D.

An Alkyd-melamine-formaldehyde (AMF) resin coating lacquer (ratio of coloured pigment (of Example 2) to white pigment is 1:10) was made according to the following procedure in accordance with the standard DIN 53235-1.

8 parts of the pigment obtained according to the procedure of Example 2, 100 parts of clear AMF (BASF FF 68-0102 14071) and 250 parts of glass pearls are ground over a 40 minute period in a Skandex stirrer. 3 parts of the resultant mixture are dispersed in 25 parts of AMF-white (BASF FD 68-0410 11074). The resultant dispersion is sprayed on to a white carton paper, allowed to air-dry for 10 minutes and then oven-dried for a further 30 minutes at 80° C.

Using a colour spectrophotometer Minolta CM-508i, the L, a, b, C and H colour spacings are measured according to the standard DIN 55986 and 6174/CIELAB 76.

The above-described procedure was repeated for the 2,9-dichloroquinacridone pigment Cinquasia Magenta RT-343D and it is found to have the following CIELAB values:

$L^*$=58.3
$a^*$=34.2
$b^*$=−16.1
$C^*$=37.8
$H^*$=334.8 whereas the pigmentary form produced according to the process described in Example 2 is found to have the following CIELAB values:

$L^*$=58.9
$a^*$=37.4
$b^*$=−14.5
$C^*$=37.8
$H^*$=334.8

The colourimetric difference is therefore:

$DC^*$=2.23
$DH^*$=2.54
$DE^*$=3.38 ($DE^*$ is the total difference in the colour change.)

APPLICATION EXAMPLE B

The procedure described in Application Example A is followed using a pigment form obtained according to Example 7 in GB 868 360 (which has been subjected to the milling process described in Example 2 of this invention) in a lacquer as described in Application Example A. The pigment has been found to have the following CIELAB values:

$L^*$=57.0
$a^*$=36.3
$b^*$=−15.9
$C^*$=39.7
$H^*$=336.3

The colourimetric differences compared to Cinquasia Magenta RT-343D pigment are as follows:

$DC^*$=0.82
$DH^*$=0.56
$DE^*$=1.00

APPLICATION EXAMPLE C

According to the standard DIN 8780/2 an AMF resin coating lacquer was made up as follows:

8 parts of pigment obtained according to Example 2, 100 parts of clear AMF (BASF FF 68-0102 14071) and 250 parts of glass pearls are ground over 40 minutes in a Skandex stirrer. 5 parts of this mixture are dispersed with 5 parts of clear AMF (BASF FF 68-0102 14071). The resulting dispersion is sprayed on to a sheet, allowed to air-dry for 10 minutes and then oven dried for 30 minutes at 80° C.

The L, a, b, C, H colour space values are measured according to the standards DIN 55986 and 6174/CIELAB 76 as described in Application Example A.

The experiment is repeated using Cinquasia Magenta RT-343D in a lacquer as described above and it has been found to have the CIELAB following values:

$L^*$.=30.0
$a^*$=23.4
$b^*$=4.1
$C^*$=23.8
$H^*$=10.0

The pigment prepared according to the Example 2 in a lacquer as described above, has been found to have the following CIELAB values:

L*=35.6
a*=38.5
b*=6.2
C*=39.0
H*=9.1

The colourimetric differences compared to Cinquasia Magenta RT-343D pigment are as follows:
DL*=5.60
DC*=15.77
DH*=−0.40
DE*=16.74

APPLICATION EXAMPLE D

The pigment prepared according to the Example 7 of GB 868 360 (which has been subjected to the milling process described in Example 2 of this invention) in a lacquer as described in Application Example C has been found to have the following CIELAB values:
L*=31.2
a*=26.5
b*=1.3
C*=26.5
H*=2.9

The colourimetric differences compared to Cinquasia Magenta RT-343D pigment are as follows:
DL*=1.25
DC*=2.76
DH*=−3.13
DE*=4.36

APPLICATION EXAMPLE E

According to the standard DIN 53775B, the preparation of 0.6% coloured PVC sheet is performed as follows:

100.0 parts of PVC-white (5% $TiO_2$) are mixed with 0.6 part of the pigment of Example 2 for about 2 minutes. The resulting mixture is passed between two rollers in a rolling mill for 5 minutes, 26 rpm to form a sheet. One of the roller is at a temperature of 178° C. and the other is at 163° C. The sheet so obtained is re-rolled at a temperature of 80° C. and then pressed between two polished sheets for 0.5 minutes at 165° C.

The L, a, b, C, H colour space values are measured according to the standards DIN 55986 and 6174/CIELAB 76 as described in Application Example A.

The experiment is repeated using Cinquasia Magenta RT-343D and it has been found to have the following CIELAB values:
L*=57.5
a*=38.8
b*=−16.1
C*=42.0
H*=337.5

The pigment prepared according to the Example 2 has been found to have the following CIELAB values:
L*=59.2
a*=38.9
b*=−15.1
C*=41.8
H*=338.8

The colourimetric differences compared to Cinquasia Magenta RT-343D pigment are as follows:
DC*=0.97
DH*=1.25
DE*=1.58

APPLICATION EXAMPLE F

The procedure of Application Example E was followed using a pigment prepared according to the Example 7 of GB 868 360 (which has been subjected to the milling process described in Example 2 of this invention). It has been found to have the following CIELAB values:
L*=58.2
a*=37.3
b*=−15.3
C*=40.3
H*=337.7

The colourimetric differences compared to Cinquasia Magenta RT-343D pigment are as follows:
DC*=−1.25
DH*=0.31
DE*=1.29

APPLICATION EXAMPLE G

According to the standard DIN 53775A, the preparation of 1% coloured PVC sheet is performed as follows:

100.0 parts of clear PVC are mixed with 1 part of pigment obtained according to the procedure of Example 2 for about 2 minutes. The resulting mixture is passed between two rollers in a rolling mill for 5 minutes, 26 rpm to form a sheet. One of the roller is at a temperature of 178° C. and the other is at 163° C. The sheet so obtained is re-rolled at a temperature of 80° C. and then pressed between two polished sheets for 0.5 minutes at 165° C.

The L, a, b, C, H colour space values are measured according to the standards DIN 55986 and 6174/CIELAB 76 as described in Application Example A.

The experiment is repeated for Cinquasia Magenta RT-343D and it has been found to have the following CIELAB values:
L*=32.3
a*=32.6
b*=8.4
C*=33.7
H*=14.4

The pigment prepared according to the Example 2 has been found to have the following CIELAB values:
L*=38.7
a*=44.9
b*=8.6
C*=45.8
H*=10.8

The colourimetric differences compared to Cinquasia Magenta RT-343D pigment are as follows:
DL*=6.26
DC*=12.50
DH*=−2.11
DE*=14.14

APPLICATION EXAMPLE H

The procedure of Application Example G was carried out on a pigment prepared according to the Example 7 of GB 868 360 (which has been subjected to the milling process described in Example 1 of this invention) and has been found to have the following CIELAB values:
L*=33.4
a*=33.6
b*=6.4
C*=34.2
H*=10.8

The colourimetric differences compared to Cinquasia Magenta RT-343D pigment are as follows:
DL*=1.06
DC*=0.53

DH*=−2.11
DE*=2.42

It is clear from the foregoing Application Examples that the pigment prepared according to the Example 2 of this invention has improved properties and can be used to colour solvent-containing and solvent-free plastics materials and plastics resins a bluish-red tone. The resultant fastness properties are very good.

What is claimed is:

1. A process of forming a polymorphic forming of 2,9-dichloroquinacridone, the process comprising reacting 2,5-di(4-choroanilino)terephthalic acid with concentrated sulphuric acid of a concentration of 90 to 95% at a temperature between 100° C. and 130° C., wherein the obtained polymorphic form of 2,9-dichloroquinacridone has an x-ray diffraction pattern including reflections corresponding to the following interplanar spacings and double glancing angles (Grade 2θ):

| d-Value(Angstroms) | Grade 2θ |
|---|---|
| 16.73 | 5.3 |
| 6.33 | 14.0 |
| 5.82 | 15.2 |
| 5.36 | 16.5 |
| 4.62 | 19.2 |
| 4.18 | 21.3 |
| 3.88 | 22.9 |
| 3.81 | 23.3 |
| 3.64 | 24.4 |
| 3.52 | 25.3 |
| 3.35 | 26.6 |
| 3.19 | 27.9 |
| 3.08 | 29.0 |
| 2.80 | 31.9 |
| 2.68 | 33.4 |
| 2.45 | 36.7 |
| 2.39 | 37.6 |
| 2.28 | 39.4. |

2. The process according to claim 1, wherein the sulphuric acid is at a concentration of 92%.

3. The process according to claim 1, wherein the reaction is carried out at a temperature of 110° C.

4. The process according to claim 1, further comprising milling the obtained crude polymorphic 2,9-dichloroquinacridone.

5. The process according to claim 1, wherein the polymorphic form of 2,9-dicholoroquinacridone is a crude polymorphic form of 2,9-dichloroquinacridone.

* * * * *